United States Patent [19]
Akai et al.

[11] Patent Number: 4,930,610
[45] Date of Patent: Jun. 5, 1990

[54] MOUNTING STRUCTURE FOR ONE-WAY CLUTCH IN AUTOMATIC TRANSMISSION

[75] Inventors: Setsukazu Akai; Minoru Sawayama, both of Kyoto, Japan

[73] Assignee: Mitsubishi Jidosha Kogyo Kabushiki Kaisha, Tokyo, Japan

[21] Appl. No.: 284,247

[22] Filed: Dec. 14, 1988

[30] Foreign Application Priority Data
Dec. 17, 1987 [JP] Japan .................... 62-191901

[51] Int. Cl.⁵ .................................. F16D 65/02
[52] U.S. Cl. ............................ 192/7; 192/109 R; 475/324
[58] Field of Search .............. 192/4 C, 7, 109 R, 115; 74/791, 790, 750 R

[56] References Cited

U.S. PATENT DOCUMENTS

| | | | |
|---|---|---|---|
| 4,092,878 | 6/1978 | Campbell | 74/750 R X |
| 4,129,050 | 12/1978 | Akashi et al. | 74/750 R |
| 4,214,489 | 7/1980 | Ahlen et al. | 74/750 R X |
| 4,610,181 | 9/1986 | Houley et al. | 74/790 X |

Primary Examiner—Rodney H. Bonck

[57] ABSTRACT

A mounting structure is provided for a one-way clutch in an automatic transmission of the type that a carrier of a planetary gear mechanism and a casing of the transmission are connected together by way of a one-way clutch allowing the carrier to rotate only in one direction along a central axis of rotation of the planetary gear mechanism. A coupling member coupling the carrier and the one-way clutch to each other is splined at an end portion thereof, which is located on the side of the carrier, with the carrier so as to allow the carrier to slide along the central axis of the rotation. A limiting member is provided to limit the range of sliding movements of the coupling member.

4 Claims, 4 Drawing Sheets

MOUNTING STRUCTURE FOR ONE-WAY CLUTCH IN AUTOMATIC TRANSMISSION

BACKGROUND OF THE INVENTION

1. Field of the Invention

This invention relates to an automatic transmission equipped with planetary gear mechanism, brakes, clutches and one-way clutch, all housed within a casing (transmission casing), and adapted to change the transmission ratio by changing the torque transmission path of the planetary gear mechanism depending on operation states of the brakes, clutches and one-way clutch, and in particular to a mounting structure for the one-way clutch in such an automatic transmission.

2. Description of the Related Art

As is illustrated in FIG. 3, an automatic transmission TM has conventionally been provided on the output side of, for example, an automotive engine via a torque converter C which is equipped with a clutch CL. This automatic transmission TM is provided (not illustrated) with a shift-controlling hydraulic (fluid pressure) circuit.

Incidentally, this automatic transmission TM has a power train as shown in FIG. 3. Namely, FIG. 3 illustrates a casing (transmission casing) TMC, a front clutch C1, a rear clutch C2, an end clutch C3, a kick down brake B1, a low reverse brake B2, a one-way clutch OWC, a planetary gear mechanism PGM, a forward sun gear FS, a reverse sun gear RS, a short pinion gear SP, a long pinion gear LP, an annulus gear AG, a kick down drum KD and a carrier CA.

The gear shift pattern of the automatic transmission TM is summarized as follows.

| Shift position | | Clutch | | | Brake | |
|---|---|---|---|---|---|---|
| | C1 | C2 | C3 | OWC | B1 | B2 |
| P Neutral | | | | | | |
| R Reverse | X | | | | | X |
| N Neutral | | | | | | |
| D First | | X | | X | | |
| Second | | X | | | X | |
| Third | X | X | X | | | |
| OD (Fourth) | | | X | | X | |

In the above table, letter "X" indicates that the respective clutch or brake is in engagement.

As is shown above, the automatic transmission TM changes the torque transmission path of the planetary gear mechanism PGM provided in the transmission casing TMC depending on operation states of the brakes B1,B2, clutches C1,C2,C3 and one-way clutch OWC also provided inside the transmission casing TMC, whereby the transmission ratio can be changed.

The mounting structure for the one-way clutch in the automatic transmission TM is depicted in FIG. 4. An inner race 1 of the one-way clutch OWC is provided on the side of the transmission casing TMC by way of a center support 2, while an outer race 3 is provided in such a way that the outer race 3 is fitted on an outer peripheral portion of the carrier CA of the planetary gear mechanism PGM.

In addition, the mounting of the outer race 3 to the carrier CA is effected by threaded engagement of plural bolts 4 in a wall portion of the carrier CA. Although not illustrated in FIG. 4, pins are provided between the bolts 4.

Plural sprags 5 are interposed between the inner race 1 and outer race 3 and further, ring-shaped end bearings 6,7 are also provided between the inner race 1 and outer race 3 so that these end bearings 6,7 are positioned along both ends of the sprags 5 respectively.

The low reverse brake B2 is also provided between a large-diameter outer peripheral portion of the outer race 3 and the transmission casing TMC.

Such a conventional mounting structure for a one-way clutch however requires high-accuracy concentricity between the inner race and the outer race so as to ensure the function of the one-way clutch. Accordingly, many components such as the transmission casing, center support, planetary gears and carriers are also required to have high-accuracy concentricity, thereby leading to a problem that a great deal of labor is required for their machining and assembly.

As the outer race is bolted on the carrier, there is another problem that the bolt securement must be strong enough to withstand the maximum torque faced by the one-way clutch.

SUMMARY OF THE INVENTION

With a view toward solving the above problems, the present invention has as a primary object the provision of a mounting structure for a one-way clutch in an automatic transmission, said mounting structure assuring the function of a one-way clutch without need for high-accuracy concentricity and moreover permitting the arrangement of a coupling member such as an outer race for the coupling of the one-way clutch and its associated carrier without relying upon bolt securement.

In one aspect of this invention, there is thus provided a mounting structure for a one-way clutch in an automatic transmission of the type that a carrier of a planetary gear mechanism and a casing of the transmission are connected together by way of a one-way clutch allowing the carrier to rotate only in one direction along a central axis of rotation of the planetary gear mechanism. A coupling member coupling the carrier and the one-way clutch to each other is splined at an end portion thereof, which is located on the side of the carrier, with the carrier so as to allow the carrier to slide along the central axis of the rotation. A limiting member is also provided to limit the range of sliding movements of the coupling member.

The mounting structure of this invention for the one-way clutch in the automatic transmission has such merits that the function of the one-way clutch can be assured by a simple construction without need for high-accuracy concentricity and unlike the conventional structure, the structural member of the one-way clutch can be attached to the carrier without relying upon the strong bolt securement subjected to torque from the one-way clutch.

BRIEF DESCRIPTION OF THE DRAWINGS

FIGS. 1 and 2 illustrate a mounting structure according to one embodiment of this invention, which is suitable for the mounting of a one-way clutch in an automatic transmission, in which FIG. 1 is a fragmentary cross-sectional view showing the state of mounting of the one-way clutch and FIG. 2 is a fragmentary cross-sectional view illustrating the state of mounting of a limiting member;

DESCRIPTION OF THE PREFERRED EMBODIMENT

Figure 3:
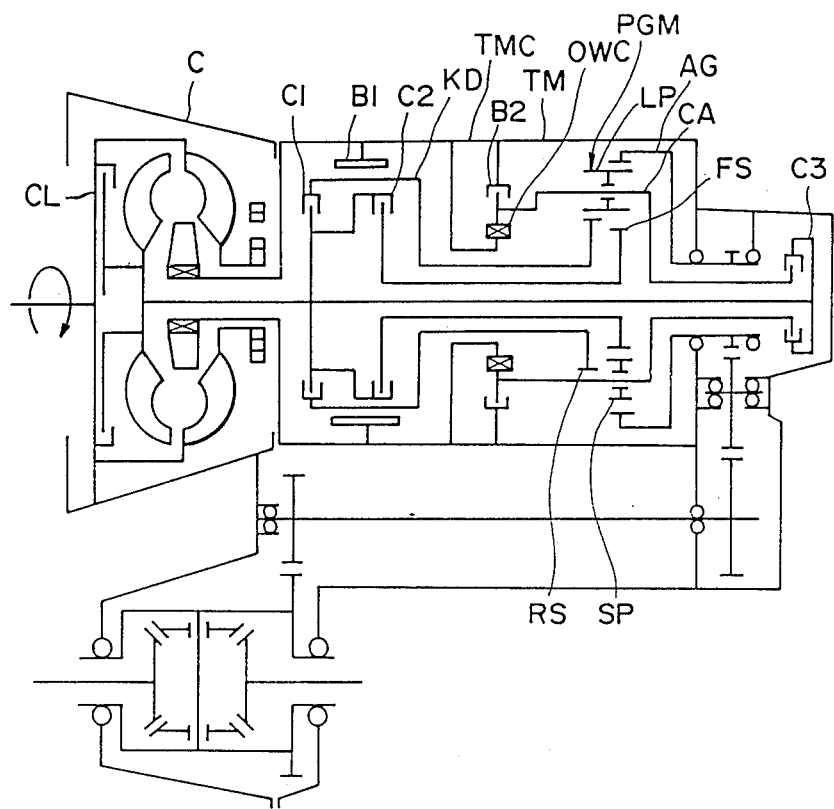
FIG. 3 is a schematic illustration of the power train of a conventional automatic transmission.
Figure 4:
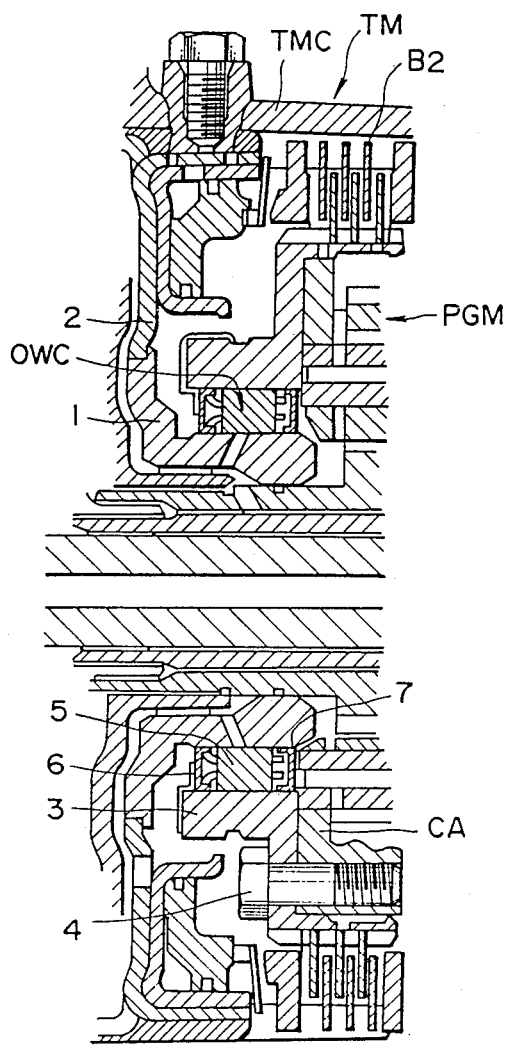
FIG. 4 is a fragmentary cross-sectional view showing the state of mounting of a one-way clutch in a conventional automatic transmission.

The illustrated embodiment also relates an automatic transmission which like the automatic transmission TM depicted in FIG. 3, can change the transmission ratio by changing the torque transmission path of the planetary gear mechanism PGM provided in the transmission casing TMC relying upon operation states of the brakes B1,B2, clutches C1,C2,C3 and one-way clutch OWC. The mounting structure of the one-way clutch OWC is however different from the conventional arrangement illustrated in FIG. 4.

Figure 1:
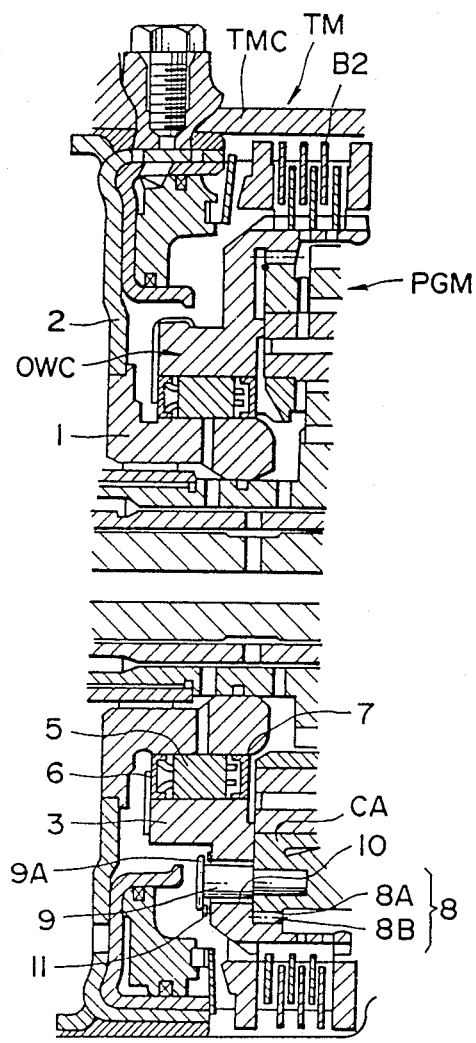

Namely, as is shown in FIG. 1, the inner race 1 of the one-way clutch OWC is provided on the side of the transmission casing TMC by way of the center support 2, while an outer race 3 which also serves as a coupling member is fitted on an outer peripheral portion of the carrier CA of the planetary gear mechanism PGM by way of a splined portion 8.

The manner of mounting of the outer race 3 to the carrier CA will be described further. On an outer peripheral portion of the carrier CA, external splines 8A are formed, whereas the cylindrical inner wall portion of the outer race 3, said wall portion being to fit on the carrier CA, defines internal splines 8B which loosely fit on the external splines 8A on the outer peripheral wall portion of the carrier, in other words, which fit on the external splines 8A while leaving a certain degree of play in both peripheral and radial directions. By fitting the internal splines 8B on the external splines 8A, the outer race 3 is mounted on the carrier CA.

No limitation is however provided in the axial direction when the outer race 3 is simply loose-fitted on the carrier CA as described above. A limiting member is hence provided to limit movements of the outer race 3 in the axial direction.

Figure 2:
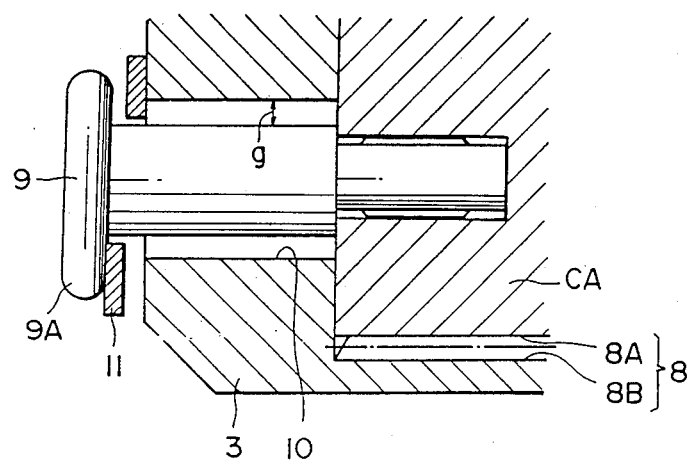

Namely, plural (for example, 3) pin holes 10 are formed at suitable angular intervals through a portion of the outer race 3, said portion facing the end wall of the carrier CA, as depicted in FIGS. 1 and 2. Loose-fitted in each pin hole 10 is a pin 9, which is secured at a right angle on the end wall of the carrier CA. A wave spring 11 is interposed between a flange portion 9A of each pin 9 and the outer race 3 so that the outer race 3 is biased toward the carrier CA.

The radial clearance g between the pin hole 10 and each pin 9 is set greater than the play between the internal splines 8B and the external splines 8A, whereby the pin 9 is not subjected to torque from the one-way clutch OWC.

For pin 9, a force-fitting split pin is used. This split pin is force-fitted in a pin hole formed in the end wall of the carrier CA while its tip portion is deformed. A bolt may be used in place of the pin 9. Needless to say, like pin 9, this bolt should also be free from torque from the one-way clutch OWC.

Between the inner race 1 and outer race 3, the plural sprags 5 are also interposed. The ring-shaped end bearings 6,7 are also provided between the inner race 1 and outer race 3 in such a way that these end bearings 6,7 are located along corresponding end portions of the sprags 5 respectively.

The low reverse brake B2 is provided between the large-diameter peripheral portion of the outer race 3 and the transmission casing TMC.

In order to attach the one-way clutch OWC by the structure described above, the outer race 3 of the one-way clutch OWC is first of all fitted on the outer peripheral portion of the carrier CA of the planetary gear mechanism PGM by way of the splined portion 8. At the same time, the pins 9 and wave springs 11 are also provided between the outer race 3 and the carrier CA so that movements of the outer race 3 in the axial direction are limited.

In addition, the inner race 1 is also attached to the side of the transmission casing TMC. Here, the sprags 5 and end bearings 6,7 are also assembled.

The spline coupling between the outer race 3 and carrier CA, as described above, permits play in the radial direction. The concentricity between the inner race 1 and outer race 3, which is essential for securing the function of the one-way clutch OWC, is not affected by the concentricity of the components of the planetary gear mechanism, whereby the following merits have been brought about. Firstly, no high-accuracy concentricity is required for various related components such as the transmission casing, center support, planetary gears and carriers, and their machining and assembly do not require too much labor. The end bearings 6,7 have heretofore been over-loaded due to lack of concentricity by the related components. Such overloading has now been eliminated, thereby making a considerable contribution to the improvement in the durability of the end bearings 7,8.

In addition, the outer race 3 is guided concentrically with the inner race 1 by the end bearings 6,7 of the one-way clutch OWC, and the one-way clutch OWC can therefore exhibit its function fully.

The outer race 3 is fitted on the outer peripheral portion of the carrier CA by way of the splined portion 8. Torque applied to the one-way clutch OWC is hence borne by the splined portion 8, so that strong bolt securement sufficient to withstand torque from the one-way clutch OWC is no longer required unlike the conventional structure.

Incidentally, axial movements of the inner race 1 may also be limited by providing the outer race 3 of the one-way clutch OWC on the side of the transmission casing TMC, fitting the inner race on the outer peripheral portion of the carrier of the planetary gear mechanism PGM by way of the splined portion 8, and providing the limiting members (pins 9 and wave springs 11), which limit axial movements of the inner race 1, between the inner race 1 and carrier CA.

What is claimed is:

1. In a mounting structure for a one-way clutch in an automatic transmission of the type that a carrier of a planetary gear mechanism and a casing of the transmission are connected together by way of a one-way clutch allowing the carrier to rotate only in one direction about a central axis of rotation of the planetary gear mechanism, the improvement wherein a coupling member coupling the carrier and the one-way clutch to each other is splined at an end portion thereof, which is located on the side of the carrier, with the carrier so as to allow the carrier to play in a radial direction relative to the central axis of the rotation and a limiting member is provided to limit a range of sliding movements of the carrier along the central axis of rotation of the coupling member.

2. In a mounting structure for a one-way clutch in an automatic transmission of the type that a carrier of planetary gear mechanism and a casing of the transmission are connected together by of one-way clutch allowing the carrier to rotate only in one direction about a central axis of rotation of the planetary gear mechanism, the improvement wherein, the coupling member coupling the carrier and the one-way clutch to each other is splined at an end portion thereof, which is located on the side of the carrier, with the carrier so as to allow the carrier to slide along the central axis of the rotation and a limiting member is provided to limit the range of sliding movements, wherein the limiting member is a pin having an inserted portion loose-fitted in a pin hole formed in the coupling member, a flange portion formed at one end of the inserted portion and having a diameter greater than the pin hole, and a pressure-fitted portion formed at the other end of the inserted portion and pressure-fitted in a locating hole formed in the carrier.

3. The mounting structure as claimed in claim 2, wherein a resilient member is arranged between the flange portion of the pin and a peripheral edge portion of the pin hole of the coupling member.

4. The mounting structure as claimed in claim 2, wherein the clearance between the pin hole and the pin is greater than a play in the direction of rotation of the carrier at the serration coupled portions of the coupling member and carrier.

* * * * *